United States Patent
Jinbo et al.

(10) Patent No.: US 6,887,134 B2
(45) Date of Patent: May 3, 2005

(54) METHOD FOR DECIDING A BEVEL CURVE, METHOD FOR DETERMINING A LOCUS OF A BEVEL, METHOD FOR PROCESSING A LENS AND APPARATUS FOR PROCESSING A LENS

(75) Inventors: Masahiro Jinbo, Shinjyuku-ku (JP); Takashi Daimaru, Shinjyuku-ku (JP)

(73) Assignee: Hoya Corporation, Tokyo (JP)

(*) Notice: Subject to any disclaimer, the term of this patent is extended or adjusted under 35 U.S.C. 154(b) by 0 days.

(21) Appl. No.: 10/899,080

(22) Filed: Jul. 27, 2004

(65) Prior Publication Data

US 2005/0009455 A1 Jan. 13, 2005

Related U.S. Application Data

(62) Division of application No. 10/406,580, filed on Apr. 4, 2003.

(30) Foreign Application Priority Data

Apr. 8, 2002 (JP) ........................................ 2002-105229

(51) Int. Cl.$^7$ ............................................... B24B 1/00
(52) U.S. Cl. ............................................ 451/43; 451/5
(58) Field of Search .......................... 451/5, 8, 9, 10, 451/11, 42, 43, 44, 240

(56) References Cited

U.S. PATENT DOCUMENTS

| | | | | |
|---|---|---|---|---|
| 6,050,877 A | * | 4/2000 | Shibata et al. | 451/5 |
| 6,089,957 A | * | 7/2000 | Shibata | 451/41 |
| 6,095,896 A | * | 8/2000 | Kobayashi | 451/5 |
| 6,328,630 B1 | * | 12/2001 | Jinbo et al. | 451/42 |
| 6,623,339 B1 | * | 9/2003 | Igarashi et al. | 451/42 |
| 6,702,653 B2 | * | 3/2004 | Shibata | 451/42 |
| 2001/0035933 A1 | | 11/2001 | Iwai et al. | |

FOREIGN PATENT DOCUMENTS

| | | |
|---|---|---|
| EP | 0432078 A2 | 6/1991 |
| EP | 0479683 A2 | 4/1992 |
| EP | 0899059 A2 | 3/1999 |
| EP | 0953405 A2 | 11/1999 |

OTHER PUBLICATIONS

European Search Report, completed Aug. 26, 2003.

* cited by examiner

*Primary Examiner*—Dung Van Nguyen
(74) *Attorney, Agent, or Firm*—Griffin & Szipl, P.C.

(57) ABSTRACT

When a forming a bevel on a lens, the value of the bevel curve is calculated based on the value of the curve of the concave face, a reference axis of the bevel curve is determined to be in the same direction as the curvature of the concave face, a reference position on the peripheral edge of the lens in the first portion having the minimum thickness is determined based on the thickness of the first portion, a correction for the initial reference axis of the bevel curve is obtained, an angle of inclination from the direction of the initial reference axis of the bevel curve is obtained based on the correction and the locus of the bevel is determined based on the value of the bevel curve, the reference position and the angle of inclination.

6 Claims, 10 Drawing Sheets

US 6,887,134 B2

METHOD FOR DECIDING A BEVEL CURVE, METHOD FOR DETERMINING A LOCUS OF A BEVEL, METHOD FOR PROCESSING A LENS AND APPARATUS FOR PROCESSING A LENS

This application is a division of U.S. patent application Ser. No. 10/406,580, filed Apr. 4, 2003, the entire disclosure of which is incorporated herein by reference.

FIELD OF THE INVENTION

The present invention relates to a method for determining a bevel curve, a method for determining a locus of a bevel, a method for processing a lens and an apparatus for processing a lens that is used for conducting these methods.

BACKGROUND OF THE INVENTION

Previously in the art of processing lenses for eyeglass spectacles and the like, apparatuses for processing a lens have been used to process an uncut lens to fit the shape of a lens frame of a spectacle frame. Various prior art apparatuses for processing a lens are known; although certain lens processing apparatuses having the so-called "function of automatic beveled processing" have been provided. When a regular lens is used as the uncut lens and processed using this type of lens processing apparatus with the automatic beveled processing feature, specific additional information is required to process the lens besides the conventional data required. Specifically, data describing the shape of the frame is necessary in addition to the conventional information required for processing the uncut lens. When all of this information is provided to the apparatus having the automatic beveled processing feature, the apparatus automatically calculates a locus of a bevel most suitable for the lens undergoing processing and the bevel is formed along this calculated locus.

On the other hand, when the uncut lens is a special lens, such as a high power minus lens, a high power plus lens, an EX lens or a lenticular lens, the prior art lens processing apparatuses having the automatic beveled processing feature have certain drawbacks. Specifically, when processing a special lens using a prior art apparatus, the position of the apex of the bevel and the bevel curve, or the bevel ratio, must be manually set by an operator who watches a computerized simulation display. Therefore, adjustment of the position of the apex of the bevel and the bevel curve, or the bevel ratio, must be performed intentionally by the operator.

However, the manual setting of the locus of a bevel depends to a great degree on the skill and the experience of the operator. Therefore, it is difficult that the bevel is formed at a suitable position without a skilled operator.

In particular, it is difficult to achieve formation of the most suitable bevel having an excellent balance in these special lenses, such as the high power minus lens, the high power plus lens, the EX lens and the lenticular lens. Occasionally, as a result of manually setting the locus of the bevel, when the processing of the special lens is completed and the special lens is fitted into the intended lens frame, peripheral edges of the processed special lens protrudes unevenly from the rim, and the appearance of the entire spectacle glass is poor.

In recent years, the number of the skilled operators, who are able to accurately set the locus of the bevel while processing a special lens, is decreasing. Under these circumstances, there is a need for technology, which enables even persons not skilled in the art of lens processing to form a suitable bevel in the special lenses.

The present invention has, as an object, enabling persons not skilled in the art of lens processing to form a suitable bevel in special lenses using an improved apparatus having an automatic bevel processing feature.

SUMMARY OF THE INVENTION

According to a first method embodiment, the present invention provides a method for determining a locus of a bevel in an EX lens comprising: determining the value of the bevel curve based on a value of a curve of a concave face of the EX lens; determining a first reference position on a peripheral edge in a portion having a minimum thickness at a lower side in a vertical direction of the EX lens based on a thickness of the portion having a minimum thickness; determining a second reference position on a peripheral edge in a portion having a maximum thickness at an upper side in a vertical direction of the EX lens based on a ratio of a thickness of the portion having a maximum thickness to the thickness of the portion having a minimum thickness and data of a shape of the EX lens to be obtained by the processing; and, determining a locus of the bevel based on the value of the bevel curve, the first reference position and the second reference position.

As the second aspect, the present invention provides a method for determining a locus of a bevel in an EX lens comprising: determining the value of the bevel curve based on a value of a curve of a concave face of the EX lens; determining an initial reference axis of the bevel curve in a same direction as a direction of a curvature of the concave face of the EX lens; determining a reference position of the bevel on a peripheral edge in a portion having a minimum thickness at a lower side in a vertical direction of the EX lens based on a thickness of the portion having a minimum thickness; obtaining the value of correction for the initial reference axis of the bevel curve based on a ratio of a thickness of a portion having a maximum thickness at an upper side in a vertical direction of the EX lens to a thickness of the portion having a minimum thickness; obtaining an angle of inclination of a reference axis of the bevel curve from a direction of the initial reference axis of the bevel curve based on the value of correction for the initial reference axis of the bevel curve and data of a shape of the EX lens to be obtained by the processing; and, determining the locus of the bevel based on the value of the bevel curve, the reference position of the bevel and the angle of inclination of the axis.

As the third aspect, the present invention provides a method for determining a locus of a bevel in a high power minus lens comprising: determining the value of the bevel curve based on a value of a curve of a convex face of the high power minus lens; determining a reference position on a peripheral edge in a portion having a minimum thickness of the high power minus lens at a side of a nose of a person wearing the high power minus lens based on a thickness of the portion having a minimum thickness; determining a second reference position on a peripheral edge in a portion having a maximum thickness of the high power minus lens at a side of an ear of a person wearing the high power minus lens based on a ratio of a thickness of the portion having a maximum thickness to the thickness of the portion having a minimum thickness and data of a shape of the high power minus lens to be obtained by the processing; and, determining the locus of the bevel based on the value of the bevel curve, the first reference position and the second reference position.

As the fourth aspect, the present invention provides a method for determining a locus of a bevel in a high power minus lens comprising: determining the value of the bevel curve based on a value of a curve of a convex face of the high power minus lens; determining an initial reference axis of a bevel curve in a same direction as a direction of a curvature of the convex face of the high power minus lens; determining a reference position of the bevel on a peripheral edge in a portion having a minimum thickness of the high power minus lens at a side of a nose of a person wearing the high power minus lens based on a thickness of the portion having a minimum thickness; calculating a value of correction for the initial reference axis of the bevel curve based on a ratio of a thickness of a portion having a maximum thickness of the high power minus lens at a side of an ear of a person wearing the high power minus lens and a thickness of the portion having a minimum thickness; calculating an angle of inclination of a reference axis of the bevel curve from a direction of the initial reference axis of the bevel curve based on the value of correction for the initial reference axis of the bevel curve and data of a shape of the high power minus lens to be obtained by the processing; and, determining the locus of the bevel based on the value of the bevel curve, the reference position of the bevel and the angle of inclination of the axis.

As the fifth aspect, the present invention provides a method for determining a locus of a bevel in a lenticular lens comprising: determining the value of the bevel curve based on a value of a curve of a concave face of the lenticular lens; determining the reference position of the bevel on a peripheral edge in a portion having a minimum thickness at a side of a nose or a ear of a person wearing the lenticular lens based on a thickness of the portion having a minimum thickness; determining a correction for a value of a curve based on a ratio of the thickness of the portion having a minimum thickness of the lenticular lens at a side of a nose or an ear to a thickness of a portion having a maximum thickness of the lenticular lens in a vertical direction; and, determining the locus of the bevel by adding the correction for a value of a curve to the value of the bevel curve and passes through the reference position of the bevel.

As the sixth aspect, the present invention provides a method for determining a locus of a bevel in a high power plus lens comprising: determining the value of the bevel curve based on a value of a curve of a concave face of the high power plus lens; determining the reference position of the bevel on a peripheral edge in a portion having a minimum thickness of the high power plus lens based on a thickness of the portion having a minimum thickness; determining a correction for a value of a curve based on a ratio of the value of a curve of the concave face to a value of a curve of a convex face of the high power plus lens or based on the value of a curve of a convex face alone of the high power plus lens; and, determining the locus of the bevel by adding the correction for a value of a curve to the value of the bevel curve and passes through the reference position of the bevel.

DETAILED DESCRIPTION OF THE ILLUSTRATIVE EMBODIMENTS OF THE INVENTION

The present invention includes both apparatus and method embodiments for processing a special lens, such as a high power plus lens, a high power minus lens, a lenticular lens and an EX lens, wherein the apparatus and method include an automatic beveled lens processing feature. The various apparatus and method embodiments are described below in detail with reference to the figures, wherein like character references indicate like parts or features.

Figure 1:
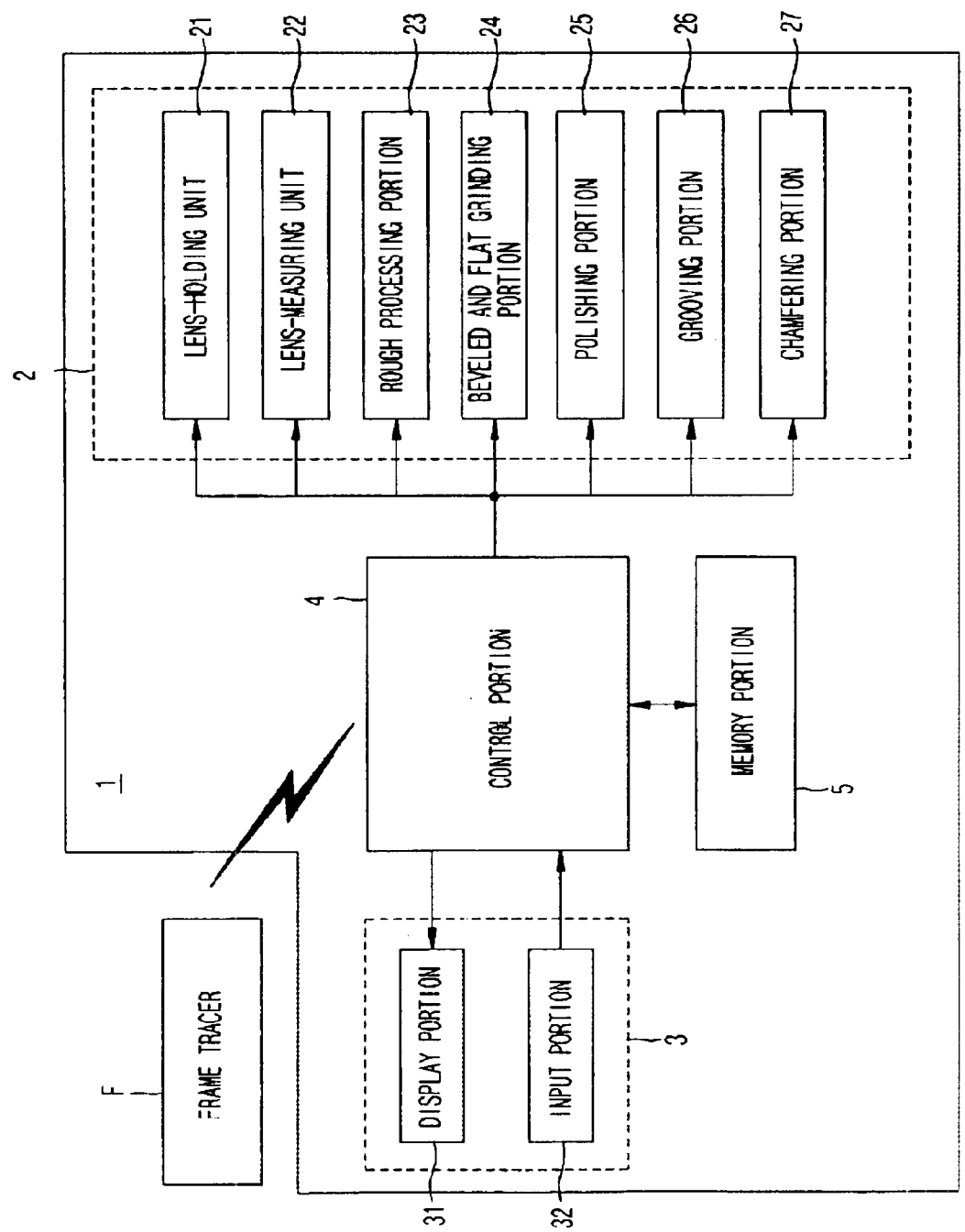
FIG. 1 is a block diagram schematically exhibiting the functioning portions of the apparatus for processing a lens in accordance with an apparatus embodiment of the present invention.

FIG. 1 is a block diagram schematically exhibiting the functional portions of the apparatus for processing a lens as an apparatus embodiment of the present invention. The apparatus 1 for processing a lens comprises a lens-processing portion 2 in which an uncut lens is processed so as to provide a processed lens having a shape fitting the lens frame of the spectacle frame (not shown). The apparatus 1 also includes an operation panel 3, a control portion 4 and a memory portion 5.

The lens-processing portion 2 comprises a lens-holding unit 21, a lens-measuring portion 22, a rough processing portion 23, a beveled and flat grinding portion 24, a polishing portion 25, a grooving portion 26 and a chamfering portion 27.

Figure 2:
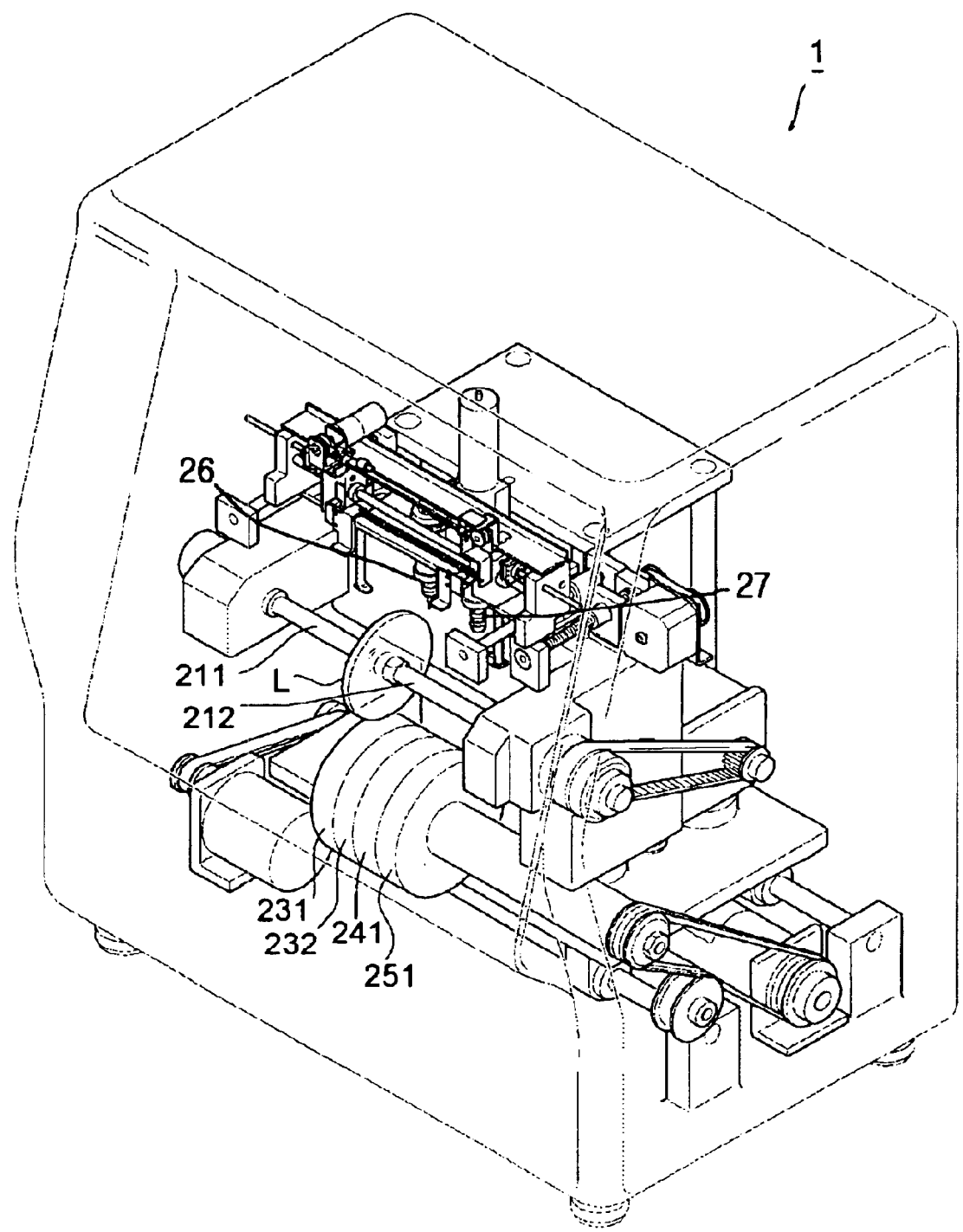
FIG. 2 is a perspective diagram schematically exhibiting the construction of the interior of the apparatus for processing a lens in accordance with an apparatus embodiment of the present invention.

The lens-holding unit 21 comprises, as shown in FIG. 2, a pair of lens-holding shafts 211 and 212 extending in the direction of the optical axis of an uncut lens L. The uncut lens is held between the two lens-holding shafts 211 and 212 at both faces of the uncut lens L. The uncut lens L is rotated around the lens center by the lens-holding shafts so that the position of the processing and the position of the measurement in the circumferential direction are moved. Due to this construction, procedures progressing from the measurement of the lens to the processing of the lens can be conducted in a singe chuck operation without releasing the chucking after the uncut lens L is held by the lens-holding unit 21.

Figure 3:
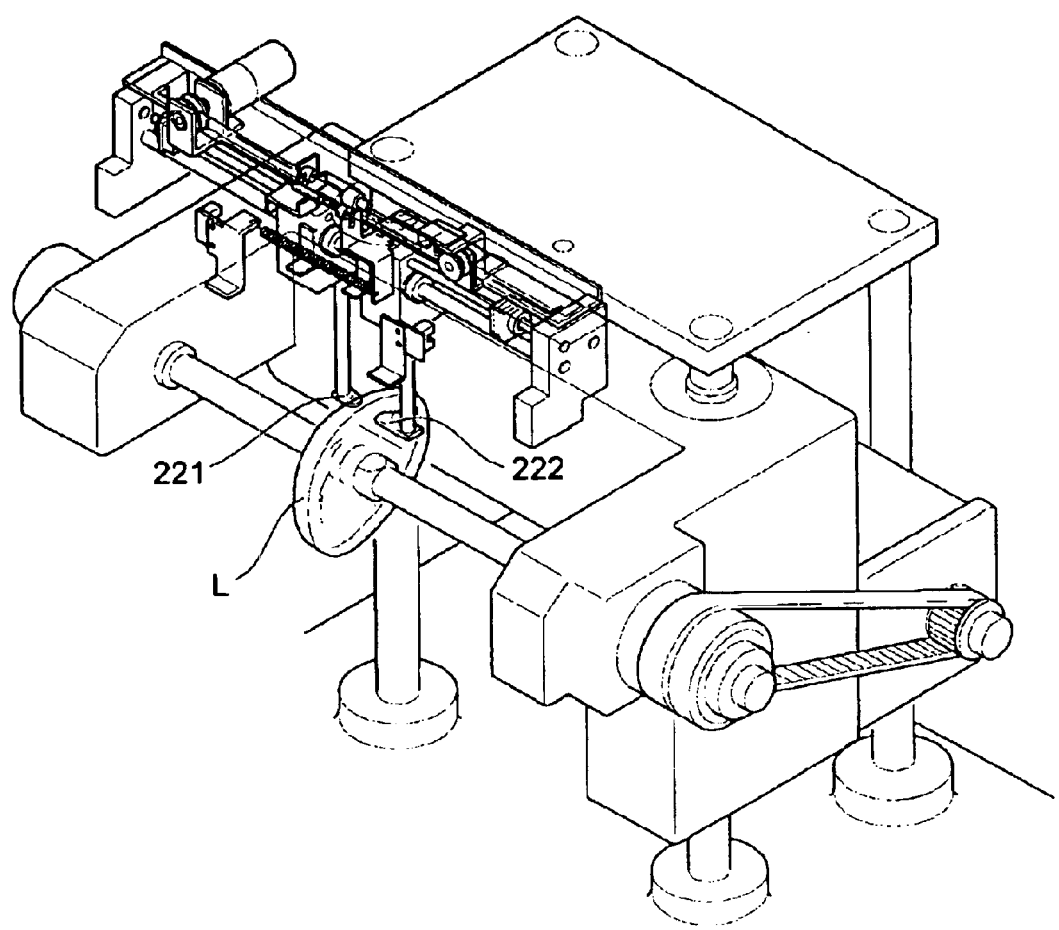
FIG. 3 is a diagram exhibiting the construction around the lens-measuring portion of the apparatus for processing a lens in accordance with an apparatus embodiment of the present invention.

The lens-measuring portion 22 comprises, as shown in FIG. 3, a pair of styluses 221 and 222 which are disposed at opposite sides of the uncut lens L so as to face each other.

By bringing the styluses 221 and 222 into contact with the concave face and the convex face, respectively, of the uncut lens L, the position of the contact (also referred to as "the position of the face of the lens") and the thickness of the lens at the position of the contact are measured. In other words, the lens-measuring portion 22 performs the measurement of the uncut lens L.

The rough processing portion 23 comprises, as shown in FIG. 2, a rough grinder 231 for a plastic lens and a rough grinder 232 for a glass lens.

The bevel and flat grinding portion 24 comprises a grinder 241 for beveled processing and flat processing, which comprises a beveled grinding portion having a groove corresponding to the bevel on the grinding face and a flat grinding portion having a flat grinding face. Grinder 241 is a finishing grinder.

The polishing portion 25 comprises a polishing grinder 251.

These grinders 231, 232, 241 and 251 are disposed on the same rotating shaft as shown in FIG. 2. The uncut lens L held by the lens-holding unit 21 is pressed against one of these grinders, which are rotated by the rotation of the rotating shaft, and the processing is conducted in accordance with the selected grinder.

The grooving portion 26 comprises a grooving tool having an end mill. The peripheral face of the lens L, after it has been processed to a prescribed peripheral shape, is cut into the prescribed depth by the end mill while the lens L is continuously rotated so that a groove can be formed.

The chamfering portion 27 comprises a chamfering tool having a grinding portion, which has an approximately hemispherical shape. The edge at the boundary between the peripheral face of the lens L and the central or main face of the lens L, both faces of which have been processed by the flat grinding or the beveled grinding, is ground by the grinding portion having the approximately hemispherical shape while the lens L is continuously rotated so that the chamfering can be conducted.

The operation panel 3 comprises a display portion 31 and an input portion 32. The display portion 31 is for displaying an estimated shape of the lens to be obtained after lens processing as well as the various information values or parameters set for processing. The input portion 32 is for inputting information necessary for processing the uncut lens L and for directing a particular desired processing.

The control portion 4 comprises a CPU and other devices, and controls operations of the apparatus 1 for processing a lens by executing the control program stored in the memory portion 5.

The memory portion 4 comprises ROM, RAM and other devices, and memorizes the control program of the apparatus 1 for processing a lens, data corresponding to the image of the lens, and other information.

In FIG. 1, a frame tracer is shown that is attached at the outside of the apparatus 1 for processing a lens, and which can communicate with the apparatus 1. The frame tracer F is used to measure the desired spectacle frame set and transfers data corresponding to the three-dimensional shape of the lens frame to the apparatus 1 for processing a lens. Therefore, the apparatus 1 for processing a lens is equipped with an interface for communicating with the frame tracer F. Although frame tracer F is generally not a component constituting a portion of the apparatus 1 for processing a lens, the apparatus 1 for processing a lens may be constructed so that the frame tracer F does constitute and integral component of the apparatus 1.

Figure 4:
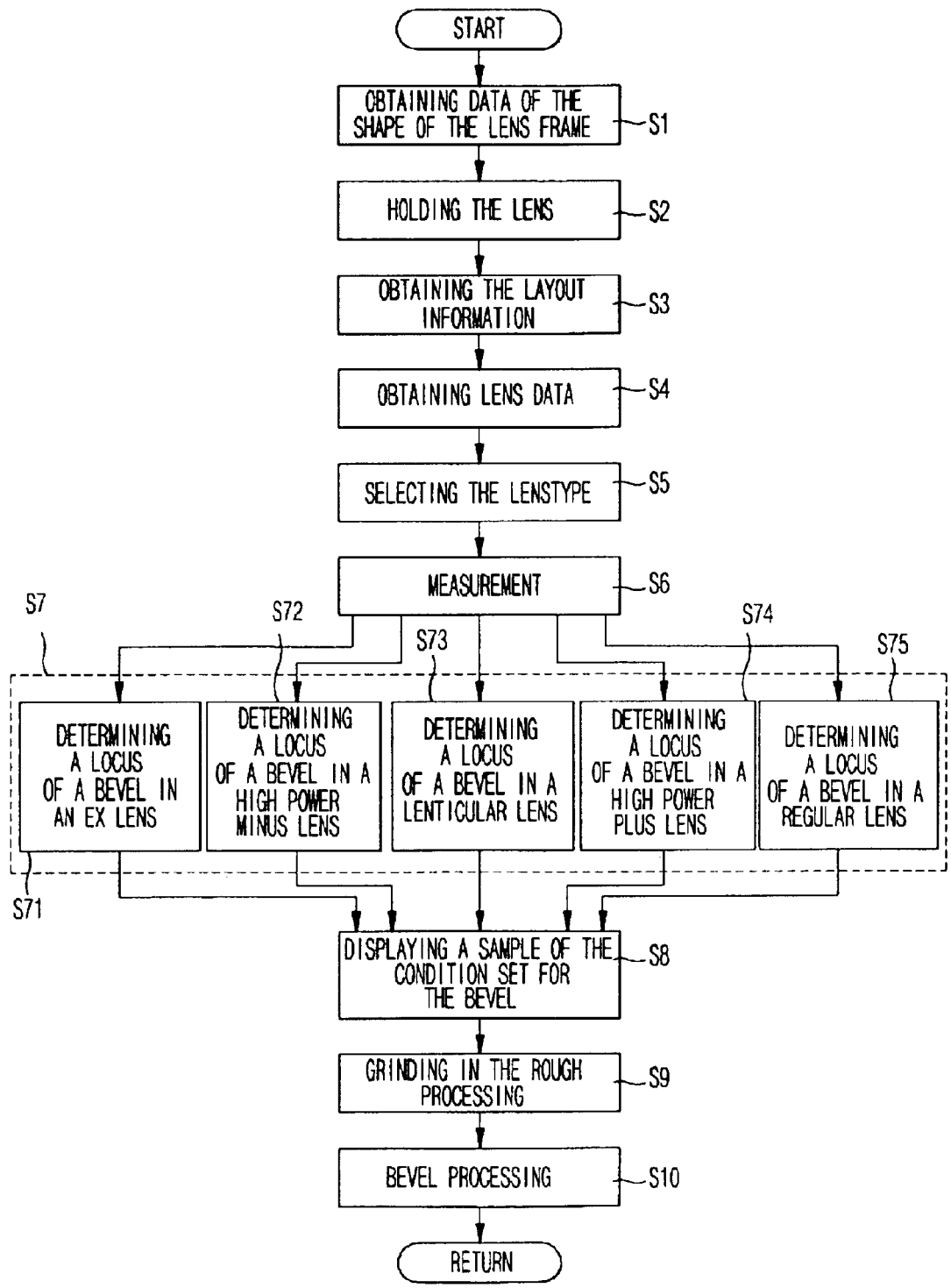
FIG. 4 shows a flow chart describing method steps of the workings of the apparatus for processing a lens as a method embodiment of the present invention.

The workings of the apparatus 1 for processing a lens will be described as follows with reference to FIG. 4. According to the method shown in FIG. 4, the first step S1 includes obtaining data corresponding to the shape of the lens frame of the spectacle frame by measuring the shape of the lens frame using the frame tracer F.

In the second step S2 of the method, the operator sets the uncut lens L in the lens-holding unit 21, and directs the holding of the lens using the input portion 32. By this lens holding operation, the uncut lens L is held by the lens-holding unit 21 in a chucked condition. While the uncut lens L is held, the optical center of the uncut lens L is placed in the axial direction of the lens-holding shafts 221 and 222 of the lens-holding unit 21.

Figure 9:
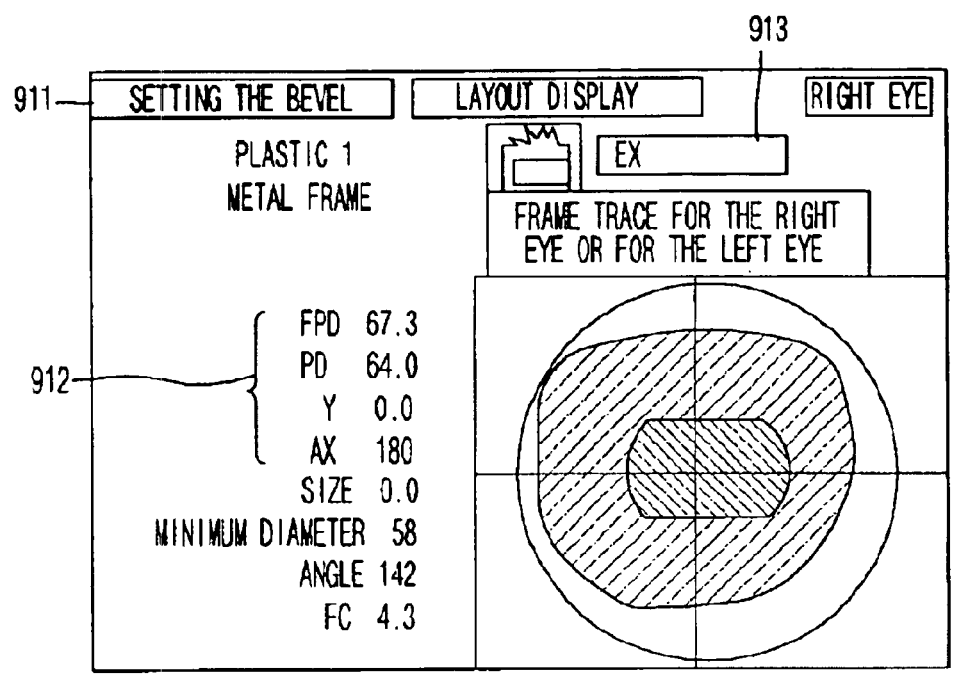
FIG. 9 is a diagram exhibiting an example of the display in the display portion of the apparatus for processing a lens as an apparatus embodiment of the present invention.

In the third step S3 according to the method, a layout display 91, such as that shown in FIG. 9, is displayed in the display portion 31 while the lens-holding unit 21 is holding the uncut lens L. Using the input portion 32 to manipulate the layout display 91, the operator indicates whether the lens to be processed is a lens for the right eye, or for the left eye, and also indicates in a column 911 that the type of the processing selected is bevel processing. The operator inputs the data corresponding to the prescription for the person who will be wearing the spectacle glasses, and other information required by the layout to include data corresponding to the distance between geometrical centers of the right and left spectacle lenses into a column 912, by using the input portion 32. When these operations that input data for the display have been conducted, the control portion 3 obtains, by a calculation based on the input data, the "data of the shape of processing," which is that data expressing, describing, or corresponding to, the shape of the lens formed after the rough grinding of the uncut lens L. The "data of the shape of processing" can also be referred to as the "shape processing data."

At this time, the operator may select, using the input portion 32, chamfering and/or grooving as an option for finishing the uncut lens.

Examples of other data corresponding to the prescription of an eyeglass spectacle include the "pupillary distance" (PD), information on the eye point including the height of the eye point relative to the geometrical center of the frame and data expressing the cylinder axis (AX). Examples of data corresponding to the distance between geometrical centers include: (a) the "frame pupillary distance" (FPD) expressing the distance between the geometrical centers of the lens frames, and (b) the "distance between lenses" (DBL) expressing the distance between the peripheries of the right and left lenses (the so called "nose width").

In the fourth step S4, the operator then inputs the lens data corresponding to the uncut lens L by using the input portion 32.

Examples of the lens data include: (a) the value of a curve, or the value of a curve for every axial direction of the convex face, of the uncut lens, (b) the value of a curve, or the value of a curve for every axial direction of the concave face, of the uncut lens, (c) the thickness of the center (i.e., the optical center or the geometrical center) of the uncut lens, (d) the diameter of the lens (including A size and B size), (e) the shape of the lens (the shape of the near optical center), and (f) the distance between the optical center and the geometrical center.

The above values of a curve may be approximate values. In addition, when processing an uncut lens, all these lens data inputs are not always necessary. The necessary data may be selected and included depending upon choices made by the operator. Furthermore, the lens data may be provided directly to the apparatus 1 for processing a lens through a data communication link with another apparatus, or by the manual input provided by the operator.

Figure 5:
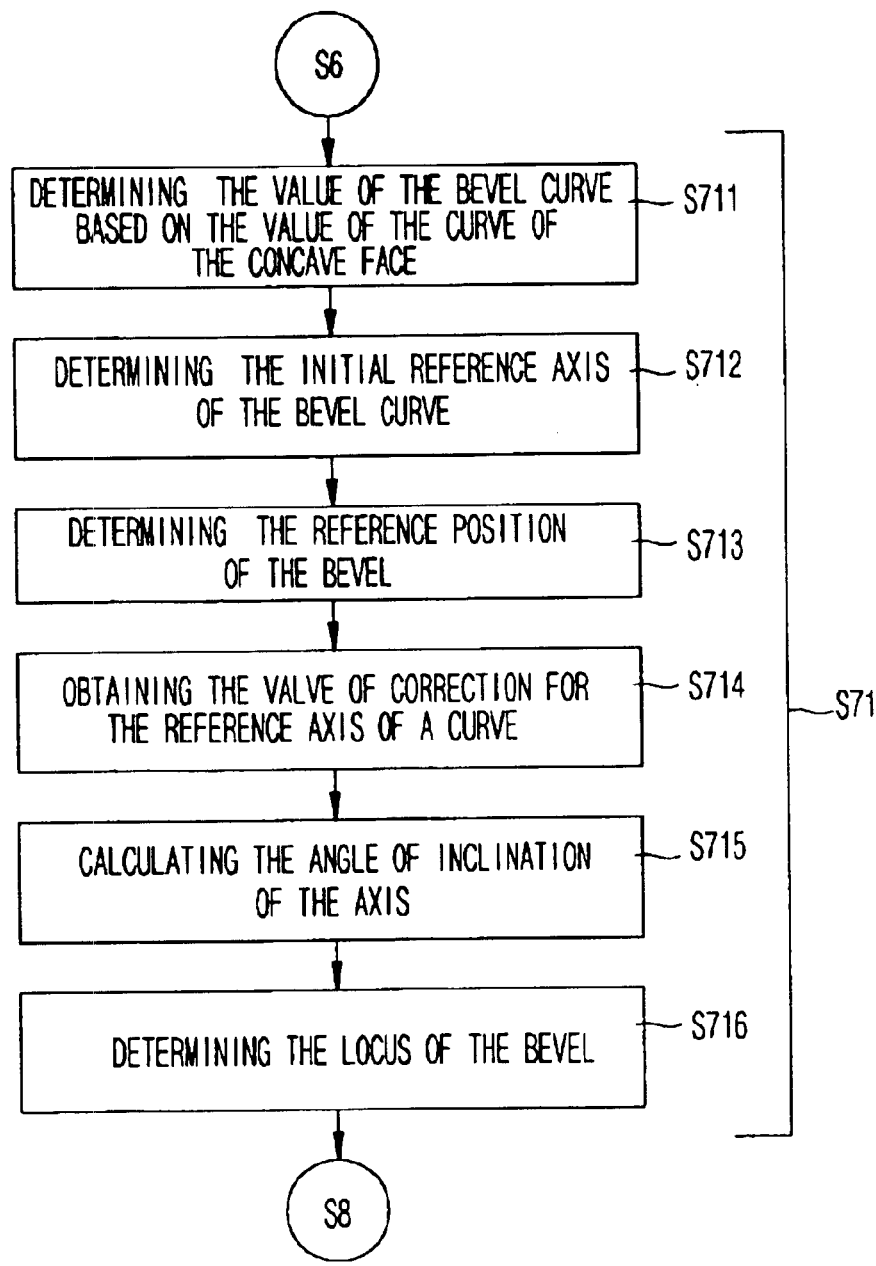
FIG. 5 shows a flow chart describing the method for determining the locus of the bevel of an EX lens.

In the fifth step S5, the operator then indicates, in column 913 of the input display 91, the type of uncut lens L to be processed by using the input portion 32. More specifically, the input portion 32 has a button for selecting the type of lens to be processed. By pushing the lens type selection button, any one of either special lenses (i.e., EX, minus-power, lenticular, plus-power) and regular lenses can be selected as the type of lens to be processed. For example, in FIG. 5, the EX lens has been selected for processing.

When the operator indicates the lens type of the uncut lens to be processed, by using the input portion 32 as described above, the control portion 4 then obtains this lens type information (also referred to as "the step of obtaining the information of the lens type"). Lens type information may be provided directly to the apparatus 1 for processing a lens 1 from an external source by means of some form of electronic communication, or the lens type information may be manually inputted by the operator.

For the purposes of this disclosure, the following are defined. The high power minus lens and the high power plus lens are meant to include lenses having a maximum thickness of the peripheral lens edge of about 5 mm or greater after the lens is processed. Since the size of the protruding portion of these lenses is great when fitted into frames, it is desirable that the bevel be accurately formed at a suitable position.

In the sixth step S6, the operator then pushes the starting switch of the input portion 32, which activates the control portion 3 to direct the measuring of the shape of the uncut lens L using lens-measuring unit 22 based on the processing shape data obtained in step S3. The styluses 221 and 222 are moved relative to the uncut lens L, which is held by the holding shafts 211 and 212, in a manner such that the positions of contact of the styluses 221 and 222 on the faces of the uncut lens form particular loci. These loci are about the same as that of the position of the peripheral edge of the lens after processing. While the styluses 221 and 222 are in the positions of contact, both the positions of contact (i.e., the positions on the faces of the lens in contact with the styluses) and the thickness of the lens at the positions of the contact are measured by the lens-measuring unit 22.

In the seventh step S7 (also referred to as "the step of calculating the locus of a bevel"), the control portion 4 calculates the locus of the bevel in accordance with the selected lens type based on the information corresponding to the selected lens type obtained in step S5 (the step of obtaining the information of the lens type) and calculates the data corresponding to the locus of the bevel, which is also referred to as the "data of the automatically set bevel curve" or as the "automatically set bevel curve data."

Step S7 includes five different pathways depending upon what type of lens is being processed. In other words, step S7 is conducted specifically for each lens type selected from the group consisting of: "EX" (step S71), "high power minus" (step S72), "lenticular" (step S73), "high power plus" (step S74) and "regular" (step S75) lenses. The step specific for each lens type will be described later in detail; however, the general idea of step S7 is to provide a method for determining the locus of a bevel in the lens to be processed. Because there are multiple different lens types, step S7 includes the five different pathways, wherein each pathway provides the sub-steps for the method for determining the locus of a bevel in a particular one of the five lens types to be processed. When a "regular" lens is selected (step S75), more specific description of the step S75 will be omitted since the procedures are well known.

In the eighth step S8, the control portion 4 directs the display portion 31 to display a "sample" of the condition set for the bevel based on the data of the locus of the bevel calculated in step S7. Then, the operator can modify or adjust the condition of the automatically set bevel (including the position and the angle of the bevel) using the input portion 32. When such a modification is made, the data of the locus of the bevel is modified from the sample conditions previously calculated in step S7.

In the ninth step S9, the operator initiates processing using the input portion 32. When the control portion 4 detects the operator's direction to start processing the lens L, the control portion 4 computes data corresponding to rough processing based on the data of the shape of processing obtained in S3. The "data of the rough processing," which is the rough processing data, includes data showing the rough processing grinding margins. The control portion 4 then controls the lens-processing portion 2 so that the rough processing of the uncut lens is conducted in accordance with the computed rough processing data. Subsequently, the peripheral portion of the uncut lens L is ground by the rough grinder 231 for a plastic lens or the rough grinder 232 for a glass lens, depending upon whether lens L is plastic or glass. The nature of the material of lens L is data that would be inputted into apparatus 1 during step S4 using input portion 32.

In the tenth step S10, the control portion 4 then computes "data of the bevel processing," also referred to as "bevel processing data," based on the data of the locus of the bevel (also referred to as the "bevel locus data") computed in step S7 (so, the "modified bevel locus data" corresponds to the data that has been modified in step S8) and the shape processing data obtained in step S3. The control portion 4 forms the bevel based on the bevel processing data thus computed. In this manner, the peripheral edge of the roughly processed lens is processed, and the desired bevel is formed by the finishing grinder provided by the grinder 241 for beveled processing and flat processing. The bevel groove is formed by the grooving portion 26 of the finishing grinder.

When the lens for the right eye has been fully processed in accordance with the above steps S1 through S10, the operation returns to step S2. The uncut lens for the lens for the left eye is held by chucking, and the lens for the left eye is fully processed in accordance with the same procedures S2 through S10.

As mentioned above, step S7 is described more fully as follows.

Special Lens Processing When the Lens is an EX Lens

In the case where an EX lens is indicated, step S7 performs step S71. Step S71 will be described in accordance with the flow chart shown in FIG. 5 with reference to the diagram shown in FIG. 10. Step S71 includes sub-steps S711 through S716.

In step S711, the value of the bevel curve K1 is computationally determined based on the value of the curve of the concave face of the EX lens contained in the lens data inputted in step S4 described above. Step S711 is referred to as "the step of determining the value of the bevel curve, and this step is a computational step that determines, by calculation, the "value of the bevel curve" (also referred to as the "bevel curve value") for the EX lens. Specifically, this calculation differs depending on whether the EX lens is a minus-power lens or a plus-power lens. The value of the bevel curve K1 is calculated in accordance with one of the following equations:

In the case of a plus-power lens:

$$K1 = (\text{average value of the curve at the concave side}) \times (\text{adjusting coefficient } e_+)$$

In the case of a minus-power lens:

$$K1 = (\text{average value of the curve at the concave side}) \times (\text{adjusting coefficient } e_-)$$

In the above equations, $e_+$ represents a number of 1 or greater and $e_-$ represents a number of 1 or smaller. In other words, $e_+ \geq 1$ and $e_- \leq 1$.

When the refractive index of the lens material is 1.523, the computed value of the bevel curve K1 and the radius of curvature r1 of the bevel curve r1 satisfy the following equation:

$$K1 \approx 523/r1$$

wherein the refractive index of the air is set at 1.0.

In step S712, which follows the calculation step S711, the reference axis of the bevel curve (hereinafter, referred to as the "initial reference axis of the bevel curve") is determined to be in the same direction as the direction of the curvature of the concave face of the EX lens. Thus, step S712 is referred to as "the step of determining the initial reference axis of the bevel curve."

Step S713 follows step S712. In step S713, the first reference position m, which is on the peripheral edge of the lens in the portion having the minimum thickness at the lower side in the vertical direction of the EX lens (see FIG. 10), is decided. Position m is referred to as "the reference position of the bevel" of the lens and is based on the thickness t1 of the portion having the minimum thickness. Step S713 is referred to as the "step of determining the first reference position." In this step, the first reference position m is expressed by the distance P1 from the end of the peripheral edge at the side of the convex face in the portion having the minimum thickness to the first reference position m. Specifically, P1 differs depending on the thickness t1 of the portion having the minimum thickness and is decided in the following manner:

When t1=2.4 mm or smaller, P1=t1/2
When t1=2.4~4.0 mm, P1=1.2
When t1=4.0 mm or greater, P1=3×t1/10

Step S714 follows step S713. In step S714, the second reference position n, which is on the peripheral edge in the portion having the maximum thickness at the upper side in the vertical direction of the EX lens (see FIG. 10), is decided based on the ratio (t2/t1) of the thickness t2 of the portion having the maximum thickness to the thickness t1 of the portion having the minimum thickness. Step S714 is referred to as the "step of determining the second reference position." The second reference position n is expressed by the distance H from the position m', corresponding to the first reference position on the peripheral edge in the portion having the maximum thickness, to the second reference position n. Hereinafter, the distance H is referred to as "the value of correction for the reference axis of a curve". Specifically, the value of correction for the reference axis of a curve H is calculated in accordance with the following equation:

$$H = a \times (t2/t1) \times (t1-P1) - (t1-P1)$$

wherein a represents an adjusting coefficient. The term (t2/t1) is 1 or greater. When a×(t2/t1) would be 1 or smaller, a×(t2/t1) is always set to equal 1 (i.e., a×(t2/t1)=1). In other words, the value for a×(t2/t1) is not allowed to be less than 1.

Step S715 follows step S714. In step S715, the angle of inclination θ of the axis from the direction of the initial reference axis of the bevel curve is calculated based on the value of correction for the reference axis of a curve H and the B size, which is the value of the vertical axis of the lens shape shown in FIG. 10. The B size is contained in the lens data inputted in step S4. Step S715 is referred to as "the step of calculating the angle of inclination of the axis." Specifically, the angle of inclination θ of the axis is calculated in accordance with the following equation:

$$\theta = \arctan(H/B)$$

Figure 10:
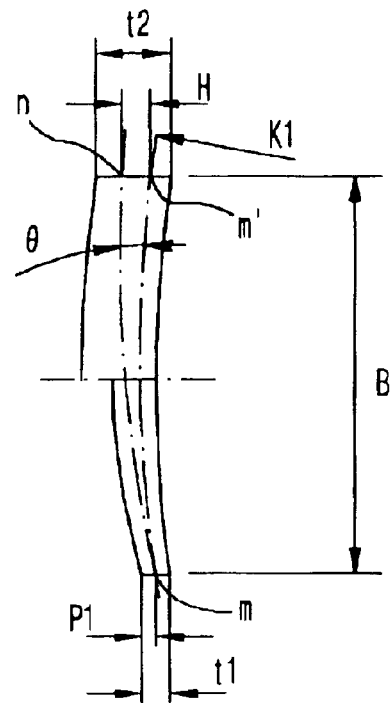
FIG. 10 is a diagram describing the method for determining the locus of the bevel of an EX lens.

Step S716 follows step S715 and is referred to as "the step of determining the locus of the bevel." In step S716, the locus of the bevel is determined based on the value of the bevel curve K1, the first reference position m, and the angle of inclination θ of the axis. Specifically, the locus of the bevel has the value of the bevel curve K1 and an axis determined by inclination of the initial reference axis of the bevel curve by the angle θ in the anti-clockwise direction as shown in FIG. 10. Thus, step S716 determines that the locus of the bevel is the reference axis of the curve. The determined locus of the bevel, computed in accordance with the procedure discussed above, has the value of the bevel curve K1 and passes through the first reference position m and the second reference position n.

In accordance with the above procedures, a suitable locus of the bevel having an excellent balance can be calculated that avoids marked protrusion of the front face of the EX lens beyond the rim of the frame when the EX lens is fitted into the frame.

Special lens processing when the lens is a high power minus lens

Figure 6:
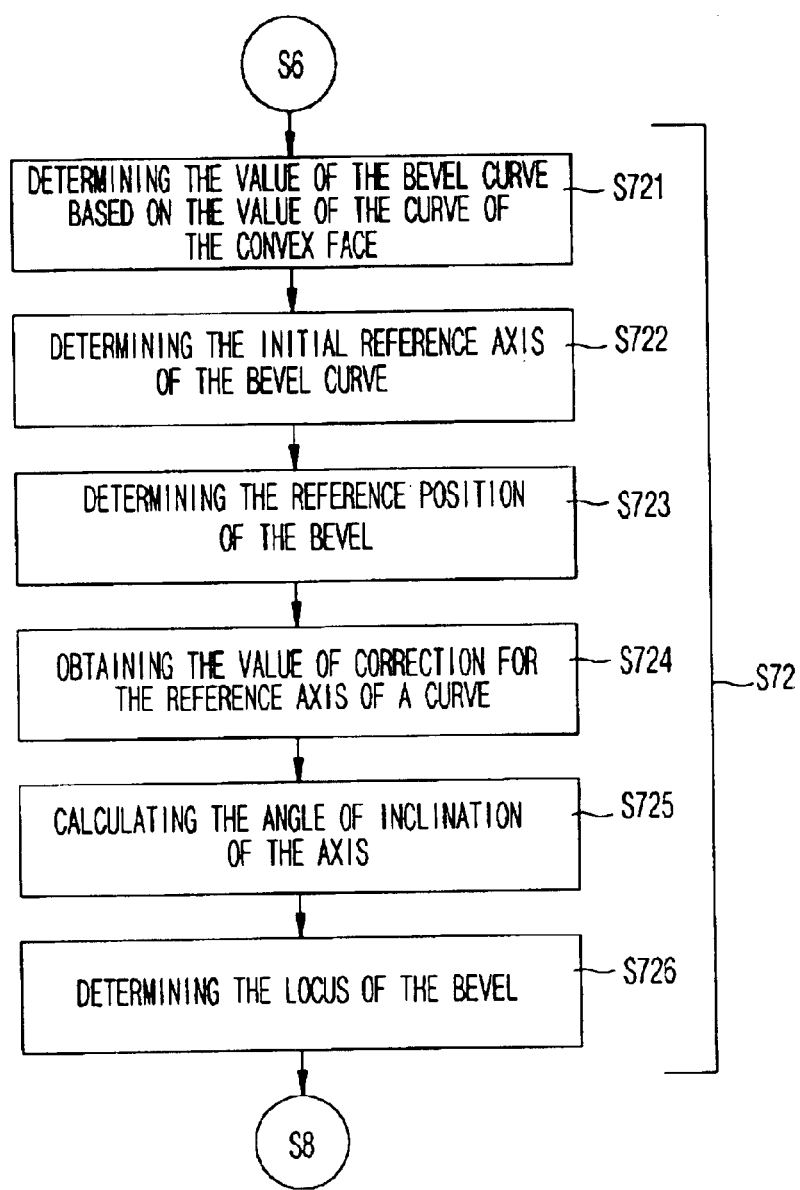
FIG. 6 shows a flow chart describing the method for determining the locus of the bevel of a high power minus lens.

In the case where a high power minus lens is indicated, step S7 performs step S72. Step S72 will be described in accordance with the flow chart shown in FIG. 6 with reference to the diagram shown in FIG. 11. Step S72 includes sub-steps S721 through S726.

In step S721, the value of the bevel curve K1 is computationally decided based on the value of the curve of the convex face of the high power minus lens contained in the lens data inputted in step S4 described above. Step S721 is referred to as "the step of determining the value of the bevel curve, and is a computational step that determines, by calculation, the value of the bevel curve ("bevel curve value") for the high power minus lens.

Specifically, the calculation differs depending on the value of the curve C of the convex face of the high power minus lens. The value of the bevel curve K1 is calculated in accordance with one of the following equations:
When the value of the curve C of the convex face is 2.0 or smaller, $$K1 = 3.0$$

When the value of the curve C of the convex face is 2.0~4.0, $$K1 = (C-2.0)/2 + 3.0$$

When the value of the curve C of the convex face is 4.0~7.0, $$K1 = C$$

When the value of the curve C of the convex face is 7.0 or greater, $$K1=7.0$$

When the refractive index of the lens material is 1.523, the computed value of a bevel curve K1 and the radius of curvature of the curve r1 satisfy the following equation:

$$K1 \approx 523/r1$$

wherein the refractive index of the air is set at 1.0.

In step S722, which follows the calculation step S721, the reference axis of the bevel curve (hereinafter, referred to as the "initial reference axis of the bevel curve") is decided to be in the same direction as the direction of the curvature of the convex face of the high power minus lens. Thus, step S722 is referred to as "the step of determining the initial reference axis of the bevel curve."

Step S723 follows step S722. In step S723, the first reference position m, which is on the peripheral edge of the lens in the portion having the minimum thickness at the side of the nose of the person wearing the high power minus lens (see FIG. 11), is decided. Position m is referred to as the "reference position of the bevel" of the lens and is based on the thickness t1 of the portion having the minimum thickness. Step S723 is referred to as "the step of determining the first reference position." In this step, the first reference position m is expressed by the distance P1 from the end of the peripheral edge at the side of the convex face in the portion having the minimum thickness to the first reference position m. Specifically, P1 differs depending on the thickness t1 of the portion having the minimum thickness and is decided in the following manner:

When t1=2.4 mm or smaller, P1=t1/2
When t1=2.4~4.0 mm, P1=1.2
When t1=4.0 mm or greater, P1=3×t1/10

Step S724 follows step S723. In step S724, the second reference position n, which is on the peripheral edge in the portion having the maximum thickness (see FIG. 11), is decided based on the ratio (t2/t1) of the thickness t2 of the portion of the high power minus lens having the maximum thickness of the high power minus lens at the side of the ear of the person wearing the high power minus lens to the thickness t1 of the portion having the minimum thickness. Step S724 is referred to as "the step of determining the second reference position." The second reference position n is expressed by the distance H from the position m', corresponding to the first reference position on the peripheral edge in the portion having the maximum thickness, to the second reference position n. Hereinafter, the distance H is referred to as the "value of correction for the reference axis of a curve." Specifically, the value of correction for the reference axis of a curve H is calculated in accordance with the following equation:

$$H=P1 \times a \times (t2/t1) - P1$$

wherein a represents an adjusting coefficient. (t2/t1) is 1 or greater. When a×(t2/t1) would be 1 or smaller, a×(t2/t1) is always set to equal 1 (i.e., a×(t2/t1)=1). In other words, the value for a×(t2/t1) is not allowed to be less than 1.

Step S725 follows step S724. In step S725, the angle of inclination θ of the axis from the direction of the initial reference axis of the bevel curve is calculated based on the value of correction for the reference axis of a curve H and the A size, which is the value of the horizontal axis of the lens shape shown in FIG. 11. The A size is contained in the lens data inputted in step S4. Step S725 is referred to as "the step of calculating the angle of inclination of the axis." Specifically, the angle of inclination θ of the axis is calculated in accordance with the following equation:

$$\theta = \arctan(H/A)$$

Figure 11:
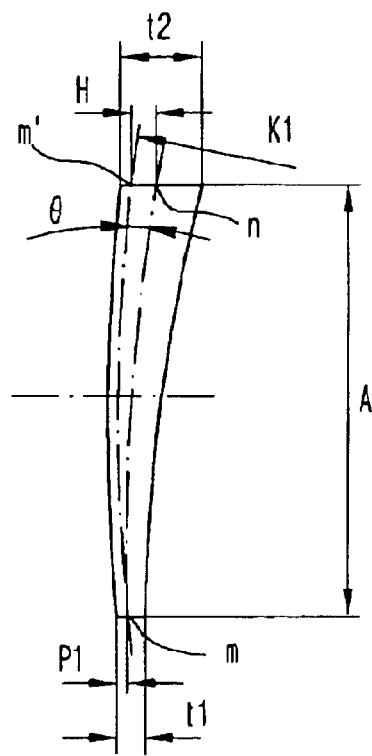
FIG. 11 is a diagram describing the method for determining the locus of the bevel of a high power minus lens.

Step S726 follows step S725 and is referred to as "the step of determining the locus of the bevel." In step S726, the locus of the bevel is determined based on the value of the bevel curve K1, the first reference position m and the angle of inclination θ of the axis. Specifically, the locus of the bevel has the value of the bevel curve K1 and an axis determined by inclination of the initial reference axis of the bevel curve by an angle θ in the clockwise direction as shown in FIG. 11. Thus, step S726 decides that the locus of the bevel is the reference axis of the curve. The decided locus of the bevel, computed in accordance with the procedure discussed above, has the value of the bevel curve K1 and passes through the first reference position m and the second reference position n.

In accordance with the above procedures, a suitable locus of the bevel having an excellent balance can be calculated that avoids marked protrusion of the back face of the high power minus lens beyond the rim of the frame when the high power minus lens is fitted into the frame.

Special Lens Processing When the Lens is a Lenticular Lens

Figure 7:
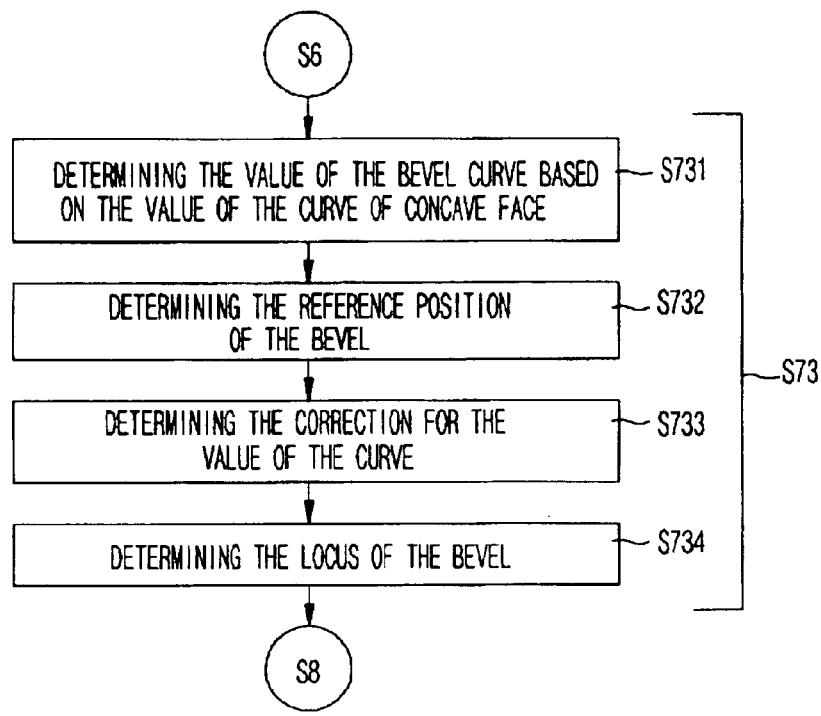
FIG. 7 shows a flow chart describing the method for determining the locus of the bevel of a lenticular lens.
Figure 12:
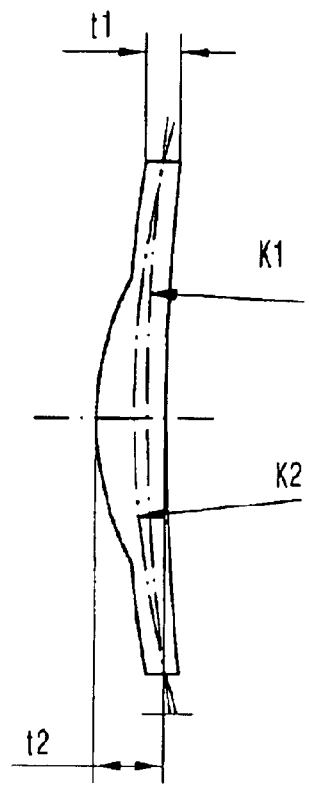
FIG. 12 is a diagram describing the method for determining the locus of the bevel of a lenticular lens.

In the case where a lenticular lens is indicated, step S7 performs step S73. Step S73 will be described in accordance with the flow chart shown in FIG. 7 with reference to the diagram shown in FIG. 12. Step S73 includes sub-steps S731 through S734.

In step S731, the value of the bevel curve K1 is computationally determined based on the value of the curve of the concave face of the lenticular lens contained in the lens data inputted in step S4 described above. Step S731 is referred to as "the step of determining the value of the bevel curve," and this step is a computational step that determines, by calculation, the "value of the bevel curve" (also referred to as the "bevel curve value"). Specifically, the value of the bevel curve K1 is calculated in accordance with the following equation:

$$K1 = (\text{average value of the curve at the concave side}) \times (\text{adjusting coefficient } e)$$

In the above equations, e represents a number of 1 or greater (i.e., e≧1).

When the refractive index of the lens material is 1.523, the computed value of the bevel curve K1 and the radius of curvature of the curve r1 satisfy the following equation:

$$K1 \approx 523/r1$$

wherein the refractive index of the air is set at 1.0.

In step S732, which follows the calculation step S731, the reference position of the bevel m, which is on the peripheral edge of the lens in the portion having the minimum thickness at the side of the nose or the ear of the person wearing the lenticular lens (see FIG. 12), is determined based on the thickness t1 of the portion having the minimum thickness. Step S732 is referred to as "the step of determining the first reference position." In this step, the reference position of the bevel m is expressed by the distance P1 from the end of the peripheral edge at the side of the convex face in the portion having the minimum thickness to the first reference position m. Specifically, P1 differs depending on the thickness t1 of the portion having the minimum thickness and is determined in the following manner:
When t1=2.4 mm or smaller, P1=t1/2
When t1=2.4~4.0 mm, P1=1.2
When t1=4.0 mm or greater, P1=3×t1/10

Step S733 follows step S732 and is referred to as "the step of determining the correction for the value of the curve." In step S722, the correction for the value of the curve S is determined based on the ratio (t2/t1) between the thickness t1 of the portion of the lenticular lens having the minimum thickness at the side of the nose or the ear of the person wearing the lenticular lens and the thickness t2 of the portion having the maximum thickness in the vertical direction of the lenticular lens. Specifically, the correction for the value of the curve S is calculated in accordance with the following equation:

$$S = a \times (t2/t1) - 1$$

wherein a represents an adjusting coefficient. (t2/t1) is 1 or greater. When $a \times (t2/t1)$ would be 1 or smaller, $a \times (t2/t1)$ is always set to equal 1 (i.e., $a \times (t2/t1)=1$). In other words, the value for $a \times (t2/t1)$ is not allowed to be less than 1.

Step S734 follows step S733 and is referred to as "the step of determining the locus of the bevel." In step S734, the locus of the bevel, which has the value of the curve K2 (=S+K1), is determined by adding the correction for the value of the curve S to the value of the bevel curve K1 that passes through the reference position of the bevel m.

In accordance with the above procedures, a suitable locus of the bevel having an excellent balance can be calculated that avoids marked protrusion of the segment in front of the lens when the lenticular lens is fitted into the frame.

Special lens processing when the lens is a high power plus lens

Figure 8:
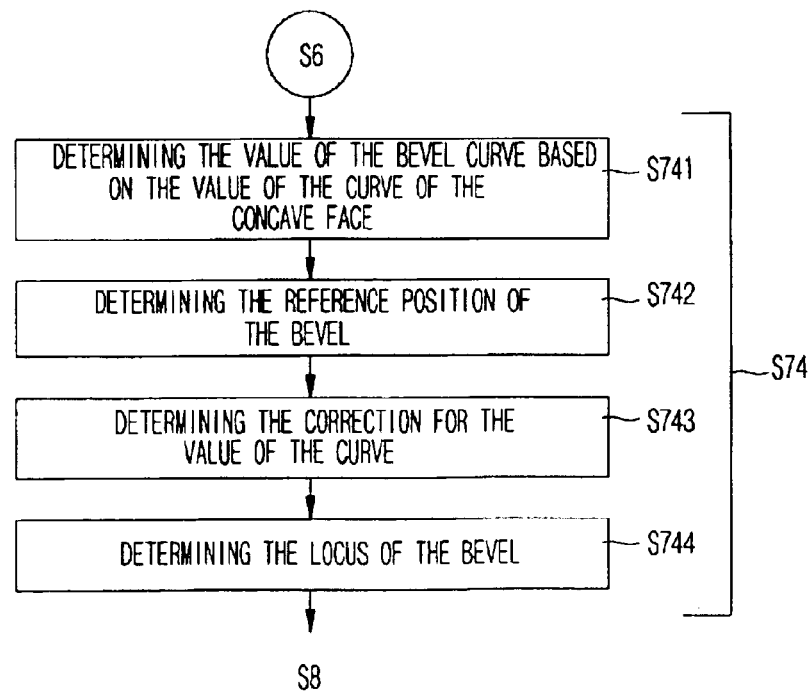
FIG. 8 shows a flow chart describing the method for determining the locus of the bevel of a high power plus lens.
Figure 13:
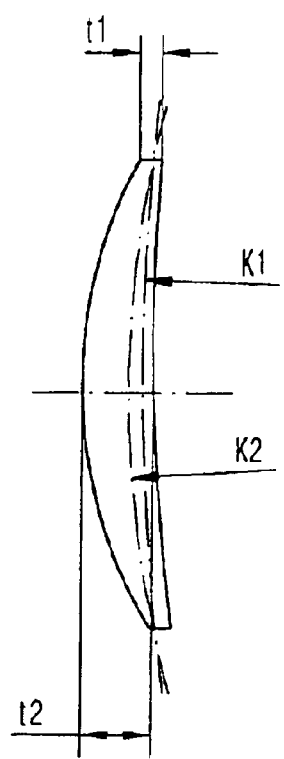
FIG. 13 is a diagram describing the method for determining the locus of the bevel of a high power plus lens.

In the case where a high power plus lens is indicated, step S7 performs step S74. Step S74 will be described in accordance with the flow chart shown in FIG. 8 with reference to the diagram shown in FIG. 13. Step S74 includes sub-steps S741 through S744.

In step S741, the value of the bevel curve K1 is computationally determined based on the value of the curve of the concave face of the high power plus lens contained in the lens data inputted in step S4 described above. Step S741 is referred to as "the step of determining the value of the bevel curve," and this step is a computational step that determines, by calculation, the "value of the bevel curve" (also referred to as the "bevel curve value"). Specifically, the value of the bevel curve K1 is calculated in accordance with the following equation:

K1=(average value of the curve at the concave side)×(adjusting coefficient e)

In the above equation, e represents a number of 1 or greater.

When the refractive index of the lens material is 1.523, the computed value of the bevel curve K1 and the radius of curvature of the curve r1 satisfy the following equation:

$$K1 \approx 523/r1$$

wherein the refractive index of the air is set at 1.0.

In step S742, which follows calculation step S741, the reference position of the bevel m, which is on the peripheral edge of the lens in the portion having the minimum thickness of the high power plus lens (see FIG. 13), is determined based on the thickness t1 of the portion having the minimum thickness. Step S742 is referred to as "the step of determining the first reference position." In this step, the reference position of the bevel m is expressed by the distance P1 from the end of the peripheral edge at the side of the convex face in the portion having the minimum thickness to the first reference position m. Specifically, P1 differs depending on the thickness t1 of the portion having the minimum thickness and is determined in the following manner:
When t1=2.4 mm or smaller, P1=t1/2
When t1=2.4~4.0 mm, P1=1.2
When t1=4.0 mm or greater, P1=3×t1/10

Step S743 follows step S742 and is referred to as "the step of determining the correction for the value of the curve." In step S743, the correction for the value of the curve S is determined based on the ratio (C2/C1) of the value of the curve C1 of the concave face to the value of the curve C2 of the convex face of the high power plus lens, or based on the value of the curve C2 of the convex face alone. Specifically, the correction for the value of the curve S is calculated in accordance with the following equation:

$$S = a \times (C2/C1) - 1$$

wherein a represents an adjusting coefficient. (C2/C1) is 1 or greater. When $a \times (C2/C1)$ would be 1 or smaller, $a \times (C2/C1)$ is always set to equal 1 (i.e., $a \times (C2/C1)=1$). In other words, the value for $a \times (C2/C1)$ is not allowed to be less than 1

Step S744 follows step S743 and is referred to as "the step of determining the locus of the bevel." In step S743, the locus of the bevel, which has the value of the curve K2 (=S+K1), is determined by adding the correction for the value of the curve S to the value of the bevel curve K1 that passes through the reference position of the bevel m.

In accordance with the above procedures, a suitable locus of the bevel having an excellent balance can be calculated that avoids marked protrusion of the convex face of the high power plus lens in front of the lens when the high power plus lens is fitted into the frame.

Incidentally, "an EX lens" is well known to a person skilled in the arts and is sometimes called "an E line multifocal lens"

In accordance with the present invention, the locus of the bevel, which has heretofore been determined by the skill and the experience of a skilled operator, can be obtained in accordance with the prescribed procedures. Therefore, the suitable bevel can be formed even by a person not skilled in the art.

What is claimed is:

1. An apparatus for processing a lens comprising:
   a means for determining a value of a bevel curve based on a value of a curve of a concave face of an EX lens;
   a means for determining a first reference position on a peripheral edge in a portion having a minimum thickness at a lower side in a vertical direction of the EX lens based on a thickness of the portion having a minimum thickness;
   a means for determining a second reference position on a peripheral edge in a portion having a maximum thickness at an upper side in a vertical direction of the EX lens based on a ratio of a thickness of the portion having a maximum thickness to the thickness of the portion having a minimum thickness and data of a shape of the EX lens to be obtained by the processing;
   a means for determining the locus of the bevel based on the value of the bevel curve, the first reference position and the second reference position; and
   a means for forming the bevel along the locus of the bevel determined by the means for determining the locus of the bevel.

2. An apparatus for processing a lens comprising:

a means for determining a value of a bevel curve based on a value of a curve of a concave face of an EX lens;

a means for determining an initial reference axis of the bevel curve in a same direction as a direction of a curvature of the concave face of the EX lens;

a means for determining a reference position of the bevel on a peripheral edge in a portion having a minimum thickness at a lower side in a vertical direction of the EX lens based on a thickness of the portion having a minimum thickness;

a means for calculating a value of correction for an initial reference axis of the bevel curve based on a ratio of a thickness of a portion having a maximum thickness at an upper side in a vertical direction of the EX lens to a thickness of the portion having a minimum thickness;

a means for calculating an angle of inclination of an axis from a direction of the initial reference axis of the bevel curve based on the value of correction for the initial reference axis of the bevel curve and data of a shape of the EX lens to be obtained by the processing;

a means for determining a locus of the bevel based on the value of the bevel curve, the reference position of the bevel and the angle of inclination of the axis; and a means for forming the bevel along the locus of the bevel determined by the means for determining the locus of the bevel.

3. An apparatus for processing a lens comprising:

a means for determining a value of a bevel curve based on a value of a curve of a convex face of a high power minus lens;

a means for determining a first reference position on a peripheral edge in a portion having a minimum thickness of the high power minus lens at a side of a nose of a person wearing the high power minus lens based on a thickness of the portion having a minimum thickness;

a means for determining a second reference position on a peripheral edge in a portion having a maximum thickness of the high power minus lens at a side of an ear of a person wearing the high power minus lens based on a ratio of a thickness of the portion having a maximum thickness to the thickness of the portion having a minimum thickness and data of a shape of the high power minus lens to be obtained by the processing;

a means for determining the locus of the bevel based on the value of the bevel curve, the first reference position and the second reference position; and a means for forming the bevel along the locus of the bevel determined by the means for determining the locus of the bevel.

4. An apparatus for processing a lens comprising:

a means for determining a value of a bevel curve based on a value of a curve of a convex face of a high power minus lens;

a means for determining an initial reference axis of the bevel curve in a same direction as a direction of a curvature of the convex face of the high power minus lens;

a means for determining a reference position of the bevel on a peripheral edge in a portion having a minimum thickness of the high power minus lens at a side of a nose of a person wearing the high power minus lens based on a thickness of the portion having a minimum thickness;

a means for calculating a value of correction for an initial reference axis of the bevel curve based on a ratio of a thickness of a portion having a maximum thickness of the high power minus lens at a side of an ear of a person wearing the high power minus lens and a thickness of the portion having a minimum thickness;

a means for calculating an angle of inclination of an axis of a reference axis of the bevel curve from a direction of the initial reference axis of the bevel curve based on the value of correction for the initial reference axis of the bevel curve and data of a shape of the high power minus lens to be obtained by the processing;

a means for determining the locus of a bevel based on the value of the bevel curve, the reference position of the bevel and the angle of inclination of the axis; and a means for forming the bevel along the locus of the bevel determined by the means for determining the locus of the bevel.

5. An apparatus for processing a lens which comprises:

a means for determining a value of a bevel curve based on a value of a curve of a concave face of a lenticular lens;

a means for determining a reference position of the bevel on a peripheral edge in a portion having a minimum thickness at a side of a nose or a ear of a person wearing the lenticular lens based on a thickness of the portion having a minimum thickness;

a means for determining a correction for a value of a curve based on a ratio of the thickness of the portion having a minimum thickness of the lenticular lens at a side of a nose or an ear to a thickness of a portion having a maximum thickness of the lenticular lens in a vertical direction;

a means for determining the locus of the bevel having a value of a curve obtained by adding the correction for a value of a curve to the value of the bevel curve and passes through the reference position of the bevel; and a means for forming the bevel along the locus of the bevel determined by the means for determining the locus of the bevel.

6. An apparatus for processing a lens comprising:

a means for determining a value of a bevel curve based on a value of a curve of a concave face of a high power plus lens;

a means for determining a reference position of the bevel on a peripheral edge in a portion having a minimum thickness of the high power plus lens based on a thickness of the portion having a minimum thickness;

a means for determining a correction for a value of a curve based on a ratio of the value of a curve of the concave face to a value of a curve of a convex face of the high power plus lens or based on the value of a curve of a convex face alone of the high power plus lens;

a means for determining the locus of the bevel having a value of a curve obtained by adding the correction for a value of a curve to the value of the bevel curve and passes through the reference position of the bevel; and a means for forming the bevel along the locus of the bevel determined by the means for determining the locus of the bevel.

* * * * *